(12) United States Patent
Ligameri et al.

(10) Patent No.: US 10,599,283 B2
(45) Date of Patent: Mar. 24, 2020

(54) DISPLAYING A PASTE PREVIEW THAT CAN BE RE-POSITIONED PRIOR TO A PASTE OPERATION

(71) Applicant: Dell Products L. P., Round Rock, TX (US)

(72) Inventors: Mark R. Ligameri, Santa Rosa, FL (US); Michiel S. Knoppert, Amsterdam (NL)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/825,329

(22) Filed: Nov. 29, 2017

(65) Prior Publication Data
US 2019/0163343 A1    May 30, 2019

(51) Int. Cl.
| | | |
|---|---|---|
| G06F 3/0354 | (2013.01) | |
| G06F 3/0481 | (2013.01) | |
| G06F 3/0488 | (2013.01) | |
| G06F 1/16 | (2006.01) | |
| G06F 9/54 | (2006.01) | |
| G06F 3/038 | (2013.01) | |

(52) U.S. Cl.
CPC ........ *G06F 3/04812* (2013.01); *G06F 1/1618* (2013.01); *G06F 1/1641* (2013.01); *G06F 1/1643* (2013.01); *G06F 1/1647* (2013.01); *G06F 3/038* (2013.01); *G06F 3/03545* (2013.01); *G06F 3/04883* (2013.01); *G06F 9/543* (2013.01); *G06F 2200/1614* (2013.01)

(58) Field of Classification Search
CPC ......... G06F 2203/04803; G06F 3/0412; G06F 9/543; G06F 17/212; G06F 3/0486; G06F 3/04883; G06F 3/03545
See application file for complete search history.

(56) References Cited

U.S. PATENT DOCUMENTS

| | | | |
|---|---|---|---|
| 7,757,165 B1* | 7/2010 | Stuple | G06F 9/543 715/236 |
| 2009/0119597 A1* | 5/2009 | Vaughan | G06T 13/80 715/732 |
| 2010/0107062 A1* | 4/2010 | Bacus | G06F 17/212 715/269 |
| 2012/0084688 A1* | 4/2012 | Robert | G06F 3/04817 715/769 |
| 2013/0238744 A1* | 9/2013 | Paschke | G06F 9/543 709/216 |

(Continued)

*Primary Examiner* — Justin S Lee
(74) *Attorney, Agent, or Firm* — Campbell Stephenson LLP; Shiv S. Naimpally

(57) ABSTRACT

In some examples, a computing device may include a first and a second touchscreen display device. A first document may be displayed on the first touchscreen and a second document may be displayed on the second touchscreen. A stylus may be used to select and copy content from the first document to a clipboard application. After receiving a preview command, the computing device may determine a first location of a tip of the stylus and display a preview of the content near the first location. The computing device may determine that the tip of the stylus has moved from the first location to a second location and move the preview of the content to be near the second location. After receiving a paste instruction from the stylus, the computing device may paste the content near the second location.

17 Claims, 12 Drawing Sheets

(56) References Cited

U.S. PATENT DOCUMENTS

| | | | |
|---|---|---|---|
| 2013/0246970 A1* | 9/2013 | Helle | G06F 3/0482 |
| | | | 715/822 |
| 2013/0285924 A1* | 10/2013 | Griffin | G06F 3/04883 |
| | | | 345/173 |
| 2014/0101577 A1* | 4/2014 | Kwak | G06F 1/1618 |
| | | | 715/761 |
| 2014/0157161 A1* | 6/2014 | Hunt | G06F 3/04886 |
| | | | 715/768 |
| 2014/0253470 A1* | 9/2014 | Havilio | G06F 3/0412 |
| | | | 345/173 |
| 2014/0267339 A1* | 9/2014 | Dowd | H04L 63/0428 |
| | | | 345/581 |
| 2014/0380142 A1* | 12/2014 | Mikutel | G06F 17/24 |
| | | | 715/234 |
| 2016/0041715 A1* | 2/2016 | Sirpal | G06F 1/1616 |
| | | | 715/770 |
| 2016/0048209 A1* | 2/2016 | Park | G06F 1/1626 |
| | | | 345/173 |
| 2016/0364029 A1* | 12/2016 | Miller | G06F 3/03547 |
| 2017/0103557 A1* | 4/2017 | Kumar | G06T 11/60 |

\* cited by examiner

BOOK ORIENTATION 302

VERTICAL TABLET ORIENTATION 304

DISPLAYING A PASTE PREVIEW THAT CAN BE RE-POSITIONED PRIOR TO A PASTE OPERATION

BACKGROUND OF THE INVENTION

Field of the Invention

This invention relates generally to computing devices and, more particularly, to displaying a preview of a paste operation prior to the paste being performed.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, when cutting (or copying) and pasting content from one document into another document (or from one part of the document to another part of the same document), a user has to guess at what the content will look like after the paste operation is performed. After the paste operation, if the content does not appear the way in which the user desires, the user may either re-size and/or re-position the content or perform another cut and paste operation.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first and a second touchscreen display device. A first document may be displayed on the first touchscreen and a second document may be displayed on the second touchscreen. A stylus may be used to select and copy content from the first document to a clipboard application. After receiving a preview command, the computing device may determine a first location of a tip of the stylus and display a preview of the content near the first location. The first location may be in the second document being displayed on the second touchscreen. The computing device may determine that the tip of the stylus has moved from the first location to a second location and move the preview of the content to be near the second location. After receiving a paste instruction from the stylus, the computing device may paste the content near the second location.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
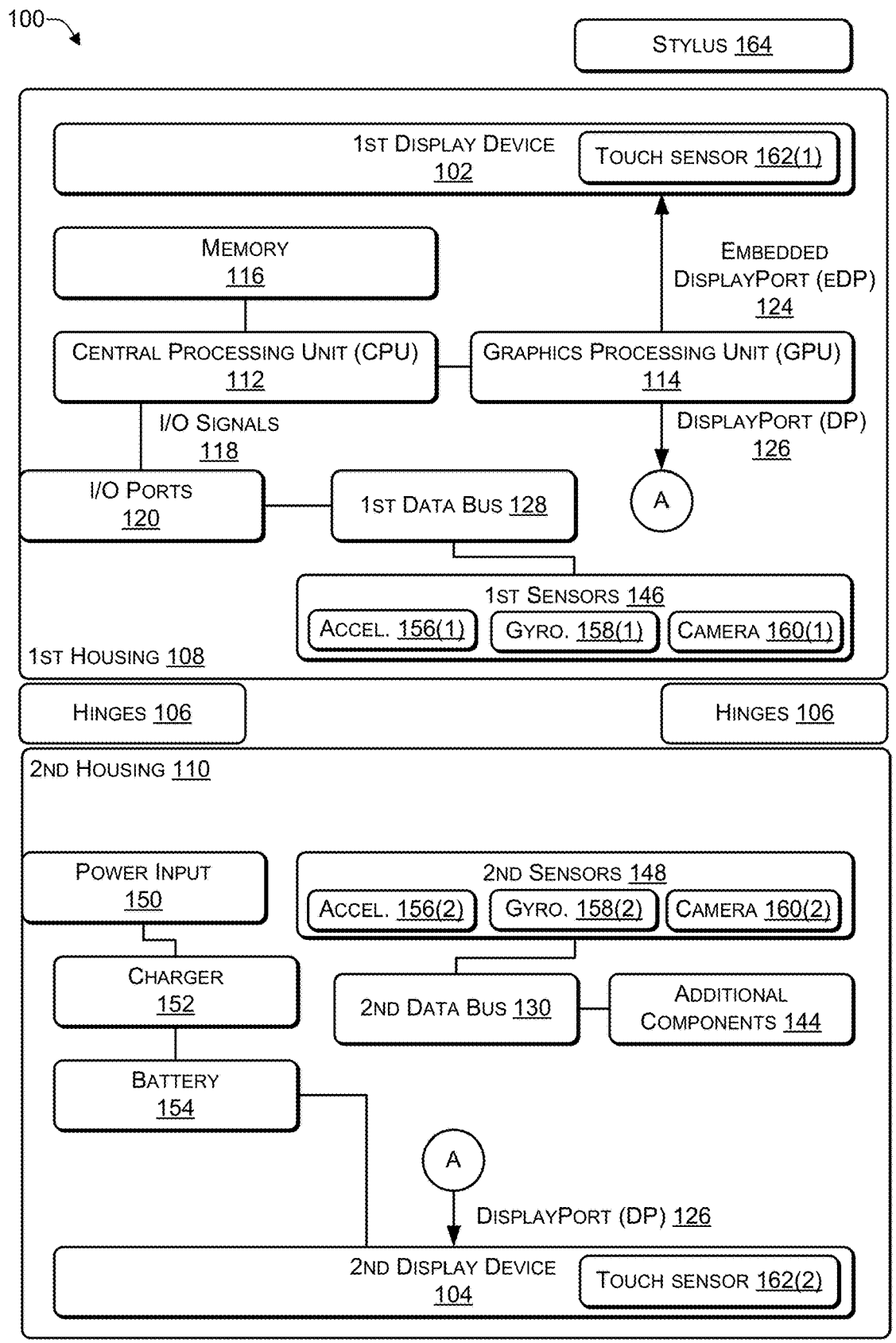
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable a user to instruct a computing device to display a preview of a paste operation prior to performing the paste operation. For example, the user may copy content from a source document to a clipboard application (or another temporary storage location). The stylus may be communicatively coupled (e.g., paired) with the computing device using a wireless near field communication (NFC) technology, such as, for example, Bluetooth®. The user may position a tip of a stylus at a particular location on a touch-sensitive display device to indicate a location where the paste preview is to be displayed. The user may select a button (or a set of button presses) of a stylus to instruct the computing device to display the paste preview in a target document. The target document may be a different document than the source document, or the target document and the source document may be different portions of the same document. While the paste preview is being displayed, the user may re-position the tip of the stylus as desired to change the location where the paste preview is being displayed. When the user is satisfied with an appearance of the paste preview, the user may instruct the computing device to paste the content at or near the location where the paste preview was being displayed. For example, the user may release (e.g., de-select) a button on the stylus that the user selected to instruct the computing device to perform the paste operation. As another example, the user may tap (single tap or double tap) the tip of the stylus while the preview is being displayed (e.g., while the preview button is selected) to instruct the computing device to perform the paste operation. In response to the receiving the paste instruction, the computing device may paste the content into the target document and stop displaying the paste preview.

The phrase "selecting a button of a stylus" refers to the action of selecting (e.g., pressing) one or more buttons and/or tapping the tip of the stylus within a predetermined time period (e.g., 500 milliseconds or less) to cause a particular function associated with the action to be performed. Thus, selecting a button may include single-clicking a button, double-clicking a button, single-clicking a first button followed by single-clicking a second button, single-clicking a button followed by single-tapping or double tapping the tip of the stylus, or other combinations of button selections and taping the stylus tip.

In a first example, a computing device may include a first touch-sensitive display device and a second touch-sensitive display device. The computing device may receive a copy command to copy content from a source document to a clipboard application. The computing device may receive a preview command from a stylus that is communicatively coupled (e.g., paired) to the computing device. The computing device may determine a first location of a tip of the stylus (e.g., on either the first touch-sensitive display device or the second touch-sensitive display device and display a preview of the content stored in the clipboard application at or near the first location of the tip of the stylus. The computing device may determine an opacity setting associated with the preview and display the preview with an opacity based at least in part on the opacity setting. For example, a default opacity setting may be 50% and the user may override the default setting and set a different opacity percentage. The computing device may determine a scaling setting associated with the preview and scale the content by modifying a size of the content based on the scaling setting to create and display the scaled content in the preview. For example, if the scaling setting is set to automatically scale the content, the computing device may automatically scale the content to fit the location in the target document. The computing device may determine an above/below setting associated with the preview and display the preview either above the tip of the stylus or below the tip of the stylus based on the above/below setting. While the preview is being displayed, the location where the preview is displayed may approximately track the location of the tip of the stylus. For example, when the computing device determines that the tip of the stylus has moved from the first location to a second location, the computing device may move a location of the preview to at or near the second location. While the preview is being displayed, the user may temporarily "freeze" the preview to enable the user to manually resize the preview. For example, the user may temporarily freeze the location of the preview by tapping the tip of the stylus once on the touchscreen display device or by selecting a button on the stylus that is mapped to a freeze function. After resizing the preview, the user may "unfreeze" the preview (e.g., by tapping the tip of the stylus or by selecting a stylus button) to enable the user to change the location of the resized preview by moving the tip of the stylus. After the user is satisfied with the location of the preview, the user may use the stylus (e.g., by double tapping the stylus tip or by selecting a button or button sequence on the stylus) to send a paste instruction to the computing device. The computing device may receive the paste instruction and paste the content into the target document (e.g., approximately where the tip of the stylus is located when the paste instruction is received). Just before performing the paste, the computing device may stop displaying the preview.

In a second example, a computing device may include a first touchscreen display coupled to a second touchscreen display by one or more hinges (or another type of mechanically coupling mechanism) that enable the first touchscreen display to be placed at an angle between about 0 degrees to about 360 degrees relative to the second touchscreen display. The computing device may include one or more processors and one or more non-transitory computer readable media storing instructions that are executable by the one or more processors to perform various operations. The operations may include displaying a first document on the first touchscreen display, receiving (e.g., from the stylus) a selection command selecting the content in a portion of the first document, receiving a copy command, copying the content from the first document, and storing the content in the clipboard application (or another temporary storage location). The operations may include displaying a second document on the second touchscreen display, receiving a preview command from a stylus, determining a first location of a tip of the stylus on the second touchscreen display, and displaying, near (e.g., within a predetermined distance from) the first location (e.g., in the second document), a preview of content stored in a clipboard application. The operations may include determining an opacity setting associated with the preview of the content and displaying the preview of the content using an opacity that is based on the opacity setting. For example, the opacity setting may have a default value of fifty percent. A preview settings user interface may enable a user to modify the default value of the opacity setting. The operations may include determining a scaling setting associated with the preview, modifying a size of the content based on the scaling setting to create scaled content, and displaying the scaled content in the preview. The computing device may move the preview in such a way as to track the movement of the tip of the stylus. For example, when the computing device determines that the tip of the stylus has moved from the first location to a second location, the computing device may automatically (e.g., without human interaction) move the preview of the content from about the first location to about the second location. The operations may include receiving an instruction to temporarily freeze the location of the preview to enable the user to resize the preview. For example, the user may tap the stylus tip once or select a stylus button to temporarily freeze the location of the preview and enable the user to resize the preview. For example, the user may use the stylus to select a handle of the preview pane and drag the handle in (towards the middle of the preview) to reduce the preview size or drag the handle out (away from the middle of the preview) to increase the preview size. The user may tap the stylus tip again (or re-select the stylus button) to unfreeze the preview and enable the user to move the resized preview by moving the tip of the stylus. The operations may include receiving, from the stylus, a paste instruction (e.g., selection of a stylus button, double tap of the stylus tip on the touchscreen display device, or the like) and pasting the content into the second document. For example, the computing device may automatically modify a size of the content based on one or more margins (e.g., top margin, bottom margin, left margin, and right margin) associated with the target document to create modified content and paste the modified content into the second document. To illustrate, if one or both of the length or the width of the original size of the content does not allow the content to fit into the target document, the computing device may automatically scale the content proportionally to fit the content into the target document.

In a third example, a computing device may include a first touch-sensitive display device coupled by one or more hinges to a second touch-sensitive display device, and one or more non-transitory computer-readable media storing instructions that are executable by one or more processors to perform various operations. The operations may include displaying a first document on the first touch-sensitive display device, receiving, from the stylus, (i) a selection command selecting content in a portion of the first (e.g., source) document and (ii) a copy command, copying the content from the first document, and storing the content in a clipboard (or other temporary storage) application. The operations may include receiving a preview command from a stylus that is associated (e.g., electronically coupled) with the computing device, determining a first location of a tip of the stylus on the second touch-sensitive display device, and displaying, near the first location, a preview of content stored in a clipboard application. Receiving the preview command from the stylus may include determining that a button on the stylus was selected and determining that the button is mapped to the preview command. The operations may include determining an opacity setting associated with the preview of the content and displaying the preview of the content using an opacity that is based on the opacity setting. The operations may include determining a scaling setting associated with the preview, modifying a size of the content based on the scaling setting to create scaled content, and displaying the scaled content in the preview. The operations may include determining that the tip of the stylus has moved from the first location to a second location on the second touch-sensitive display device and moving the preview of the content from near the first location to near the second location. The user may tap the tip of the stylus or select a button of the stylus to temporarily freeze the location of the preview and enable the user to resize the preview. For example, the user may use the stylus to grab a handle of the preview pane and move the handle to increase or decrease a size of the preview. After resizing the preview, the user may again tap the tip of the stylus (or select the button) to unfreeze the preview and enable the user to reposition the preview by moving the tip of the stylus. The operations may include receiving a paste instruction and pasting the content into a target document that is being displayed on the second touch-sensitive display device. For example, the user may provide the paste instruction by performing a tap gesture (e.g., using the tip of the stylus on the second touch-sensitive display device) while the preview of the content is being displayed. As another example, while the preview of the content is being displayed, the user may provide the paste instruction by releasing the button on the stylus that caused the preview to be displayed. Pasting the content into the target document that is being displayed on the second touch-sensitive display device may include automatically modifying a size of the content based on one or more margins associated with the target document to create modified content; and pasting the modified content into the target document.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106. The hinges 106 may enable the two housings 108, 110 to be positioned at different angles relative to each other in different orientations (e.g., various vertical orientations and various horizontal orientations). Of course, additional housings may be attached via additional hinges to create a computing device with multiple housings.

A first display device 102 may be located in the first housing 108 and, in some cases, a second display device 104 may be located in the second housing 110. A first portion of the components of the computing device 100 may be located in the first housing 108 (e.g., behind the first display device 102) while a remaining portion of the components of the computing device 100 may be located in the second housing 110 (e.g., behind the second display device 104). For example, as illustrated in FIG. 1, the components located in the first housing 108 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 108 and two or more lanes of DisplayPort (DP) output 126 that are sent (e.g., wirelessly or via a cable) to the second display device 110 in the second housing 110.

A first data bus 128 in the first housing 108 and a second data bus 130 in the second housing 110 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110. The first set of sensors 146 may include one or more of an accelerometer 156(1), a gyroscope 158(1), an electronic compass (e-compass), a barometer, a magnetometer, a proximity sensor, a light sensor, a camera 160(1) (or another type of imaging sensor), a fingerprint sensor, a global positioning satellite (GPS) sensor, a sensor to detect movement of (e.g., detect a change in an angle between) the hinges 106, a proximity sensor, another type of sensor, or any combination thereof. The second set of sensors 148 may include one or more of an accelerometer 156(2), a gyroscope 158(2), an electronic compass (e-compass), a barometer, a magnetometer, a proximity sensor, a light sensor, a camera 160(2) (or another type of imaging sensor), a fingerprint sensor, a global positioning satellite (GPS) sensor, a sensor to detect movement of (e.g., detect a change in an angle between) the hinges 106, a proximity sensor another type of sensor, or any combination thereof.

The first display device 102 may include a touch input sensor 162(1) that is capable of receiving input via pressure applied by a stylus 164 or by a human appendage (e.g., finger) to a surface of the first display device 102. The second display device 104 may include a touch input sensor 162(2) that is capable of receiving input via pressure applied by the stylus 164 or by a human appendage (e.g., finger) to a surface of the second display device 104.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. For example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. For example, the components may be distributed between the housings 108, 110 to enable each of the housings 108, 110 to heat to approximately the same temperature. Doing so may avoid grouping components that generate the most heat into the same housing, thereby causing one housing to be hotter than the other housing. In addition, while the computing device 100 is illustrated as having two display devices 102, 104, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Thus, a computing device may include a first housing coupled to a second housing by one or more hinges. The computing device 100 may include software that enables a user to use the computing device 100 with a stylus in a manner similar to a pad of paper (or paper-based notebook) and ink-based pen (or graphite-based pencil). Various sensors, such as, for example, gyroscopes, electronic compasses (e.g., magnetometers), accelerometers, and the like, may be used to determine the screen orientation for the computing device 100. The user's position relative to the computing device 100 may be determined using sensor data (e.g., touch screen data, imaging data, and the like) to determine which display device to enable (e.g., route content to) and which screen to temporarily disable (e.g., turn off or not route content to). The computing device 100 may determine how to orient content on the screen(s) to which content is sent.

Each instance where the computing device determines that the orientation has of the computing device has changed, the computing device may determine the user's position relative to the computing device 100. The user's position may include information such as which display device(s) the user is facing and how the user is positioned (e.g., oriented relative) to each of the display device(s). Based on the device orientation and the user's position, the computing device 100 may route content to one or both display devices and orient the content accordingly (e.g., by rotating the content 0, 90, 180, or 270 degrees). For example, particular orientations, such as, for example, a book orientation, a tent orientation, a presentation orientation, a horizontal orientation, a clamshell orientation, or another orientation may cause the computing device 100 to route content to one or both display devices and determine how much the content is to be rotated when sent to each display device. In addition, the computing device 100 may learn the user's behavior, e.g., whether the user is right handed or left handed, where the user is positioned when providing stylus input, where the user is positioned for each particular orientation of the computing device, and the like. The learned behavior for each user of the computing device 100 may be stored in a user profile and recalled (e.g., retrieved) each time a particular user logs in.

The display devices may be configured to behave as independent display devices or a first display device may be configured as an extension of a second display device to enable both display devices to function as a single larger sized display device. The operating system of the computing device 100 may enable the user to "lock" a particular orientation (e.g., rotation) of the content being displayed on each display device to avoid the computing device 100 repeatedly re-orientating (e.g., rotating) the content as the user moves (e.g., re-positions) the computing device 100.

Figure 2:
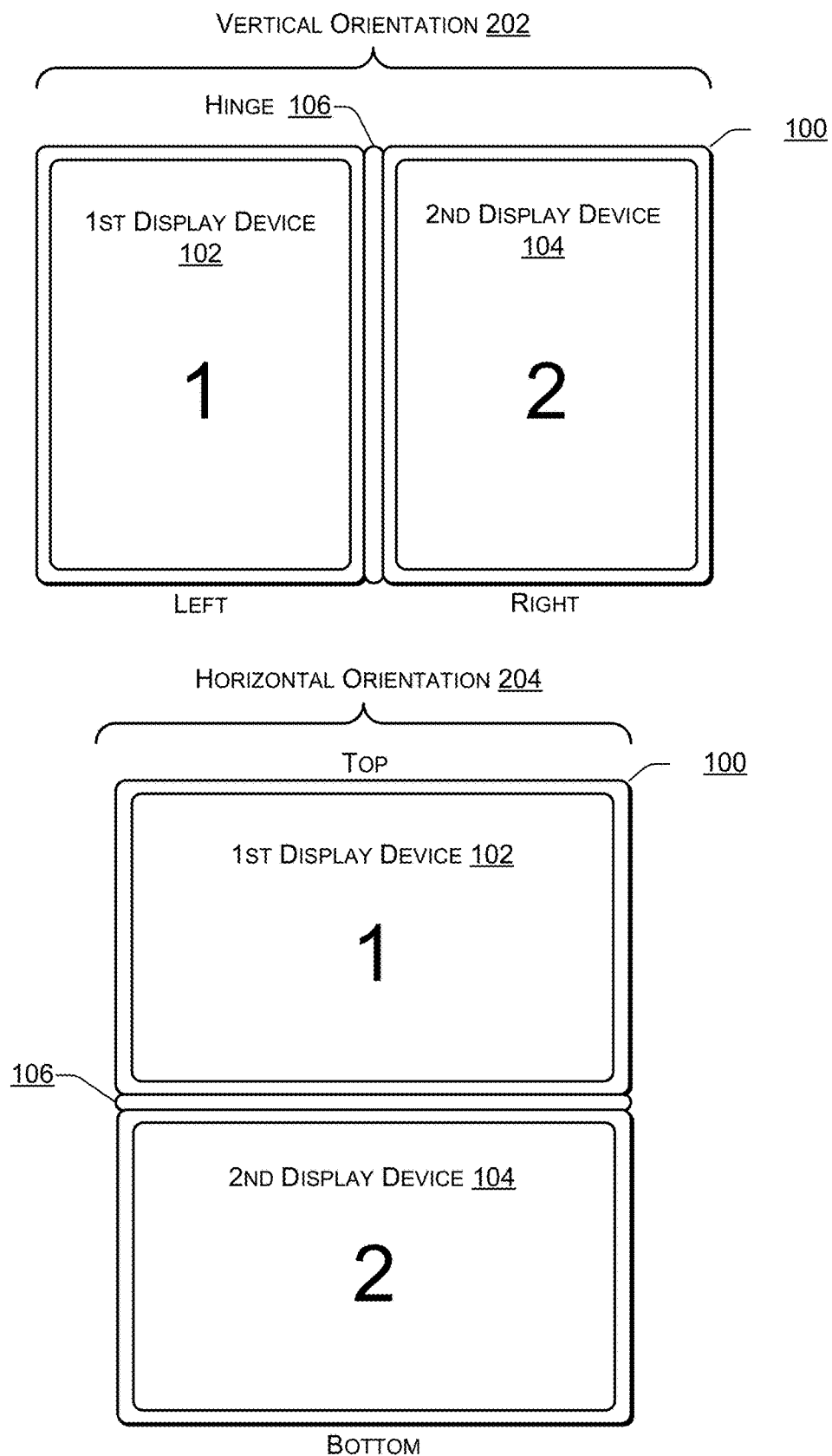
FIG. 2 is a block diagram illustrating different orientations of a dual-display device according to some embodiments.
Figure 3:
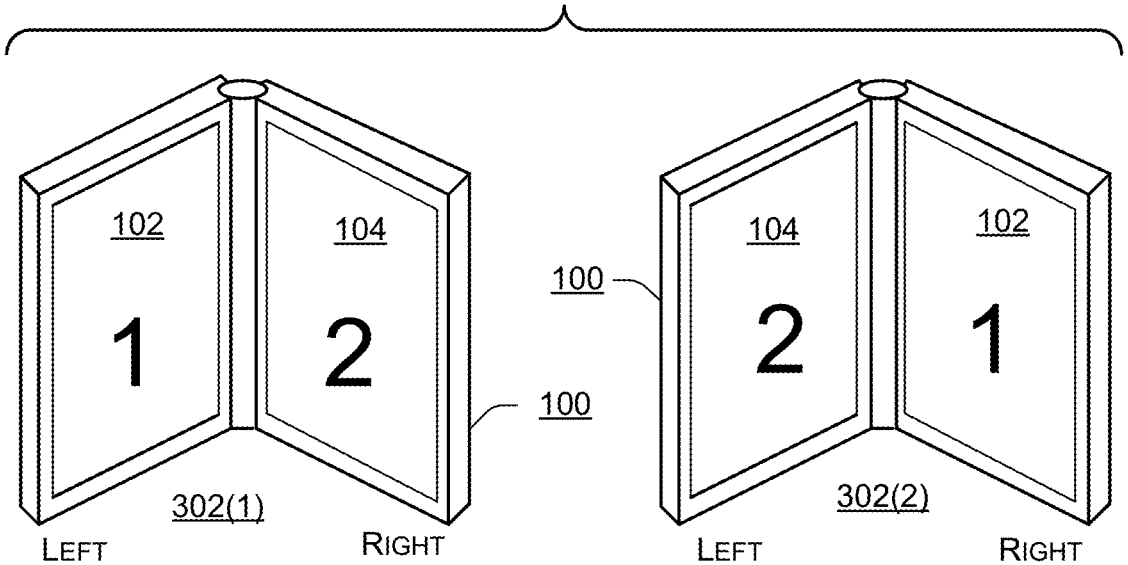
FIG. 3 is a block diagram illustrating modes of a dual-display device in a vertical orientation according to some embodiments.
Figure 3:
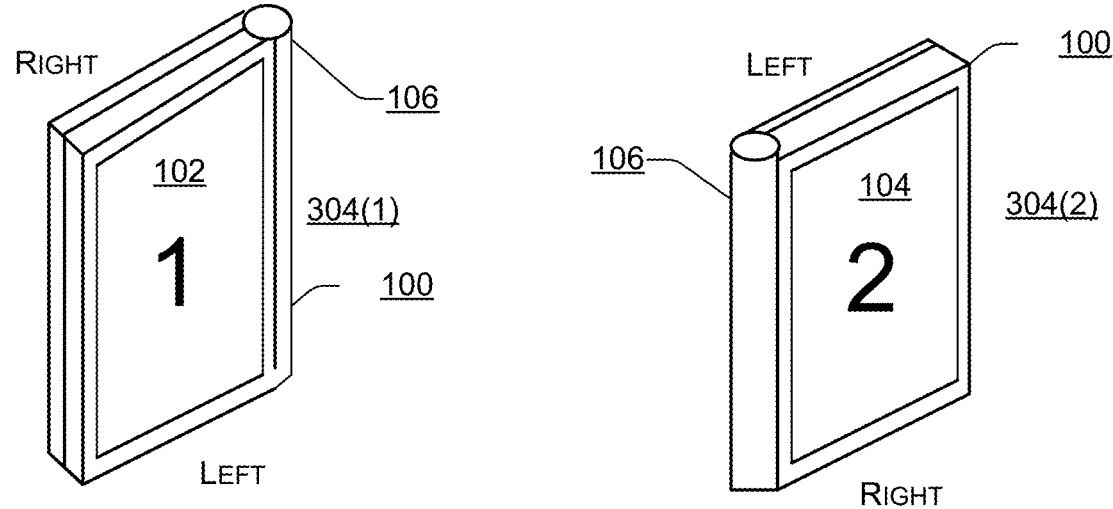

FIG. 2 is a block diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. For example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

FIG. 3 is a block diagram 300 illustrating additional vertical orientations of a dual-display device according to some embodiments. Additional examples of the vertical orientation 202 may include a book orientation 302 and a vertical tablet orientation 304. For example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), the first display device 102 may be facing a user and the second display device 104 may be rotated approximately 360 degrees to face away from the user. In a second vertical tablet orientation 304(2), the second display device 104 may be facing the user while the first display device 102 may rotated approximately 360 degrees to face away from the user.

Figure 4:
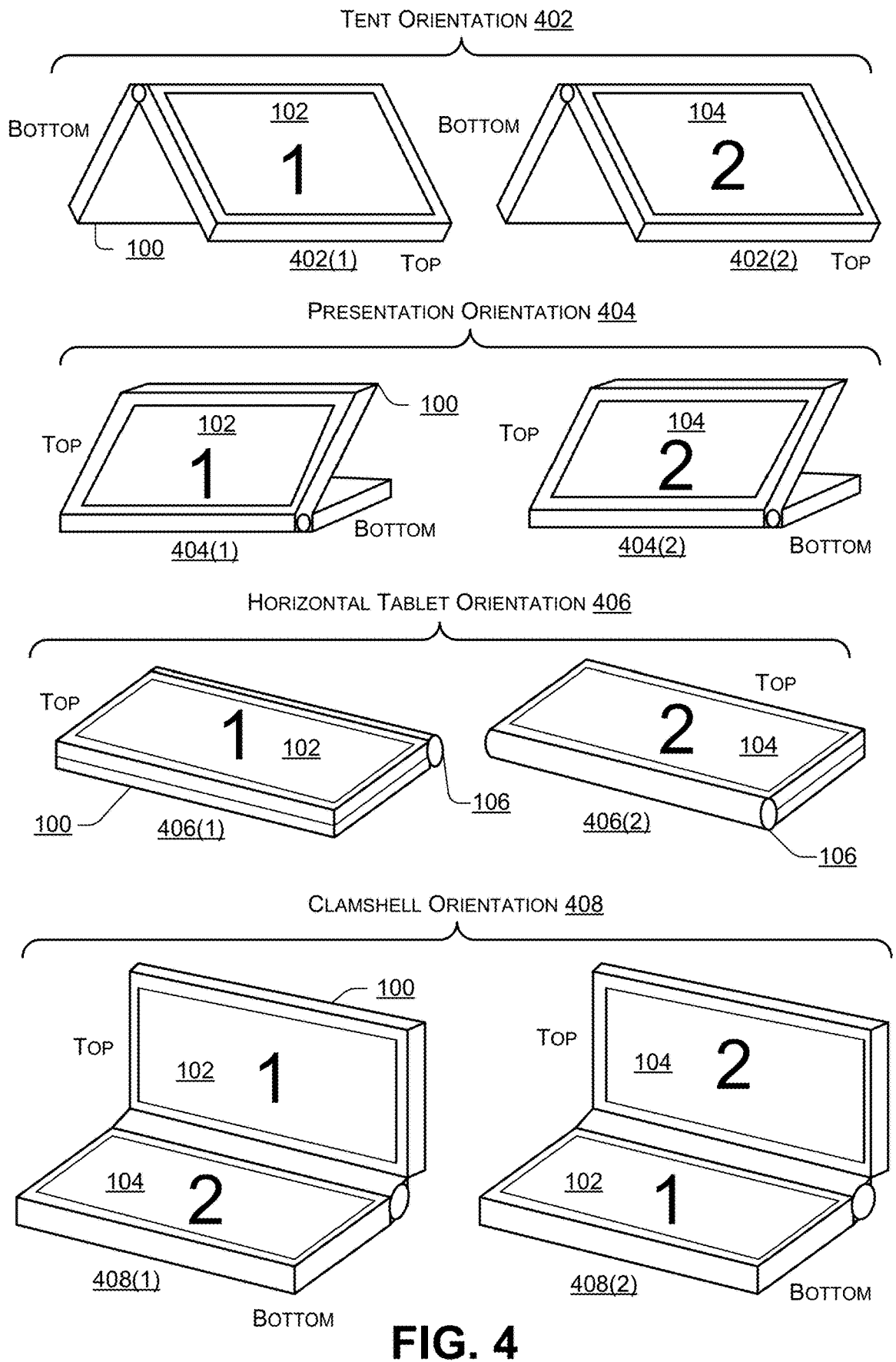
FIG. 4 is a block diagram illustrating modes of a dual-display device in a horizontal orientation according to some embodiments.

FIG. 4 is a block diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user.

In 404(1), the first display device 102 may be at the top facing the user and the second display device 104 may be at the bottom facing down. In 404(2) the second display device 104 may be at the top facing the user and the first display device 102 may be at the bottom facing down.

In 406(1), the first display device 102 may be at the top facing the user and the second display device 104 may be at the bottom facing down (e.g., away from the user). In 406(2), the second display device 104 may be at the top facing the user and the first display device 102 may be at the bottom facing down (e.g., away from the user).

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
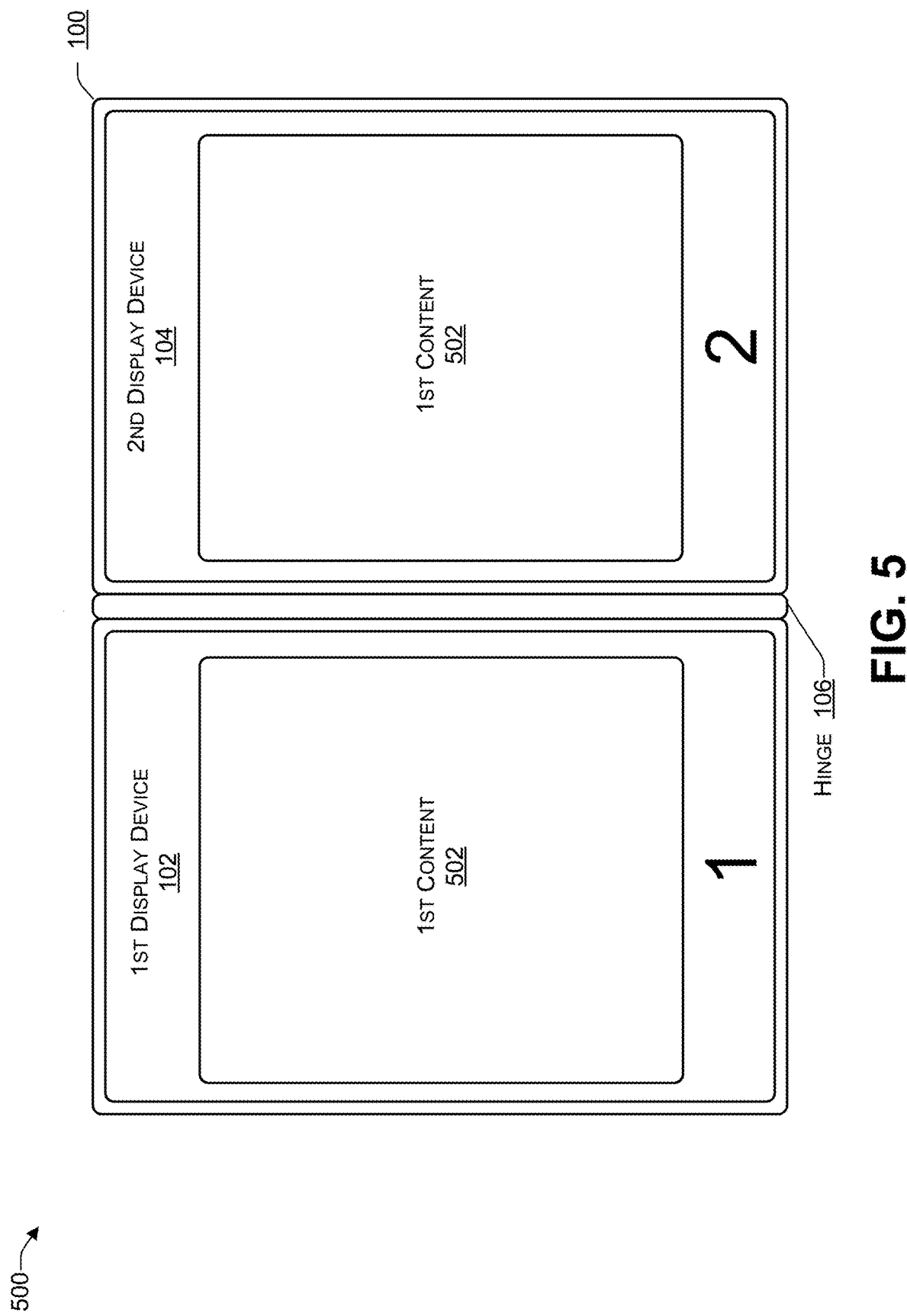
FIG. 5 is a block diagram illustrating a dual-display device in which the operating system is in a clone mode according to some embodiments.

FIG. 5 is a block diagram 500 illustrating a dual-display device in which the operating system is in a clone mode according to some embodiments. An operating system of the computing device 102, such as Microsoft® Windows®, may provide three display modes: (a) an extended desktop mode in which the display devices 110, 112 behave as if they were a single display device, with the display device 112 behaving as an extension of the display device 110 (b) a clone mode in which each of the display devices 110, 112 display the same content, or (c) a single display mode, e.g., one of the display devices 110, 112 displays content while the other display device is off (or blank) and does not display content. For example, single display mode may be used when the computing device is in a tablet orientation to turn off a particular display device (of the display devices 102, 104) that is not facing the user or is not visible to the user.

In the clone mode, first content 502 may be displayed on the first display device 102. The first content 502 may also be displayed on the second display device 104. Thus, in the clone mode, the same content 502 may be displayed on both display devices 102, 104.

Figure 6:
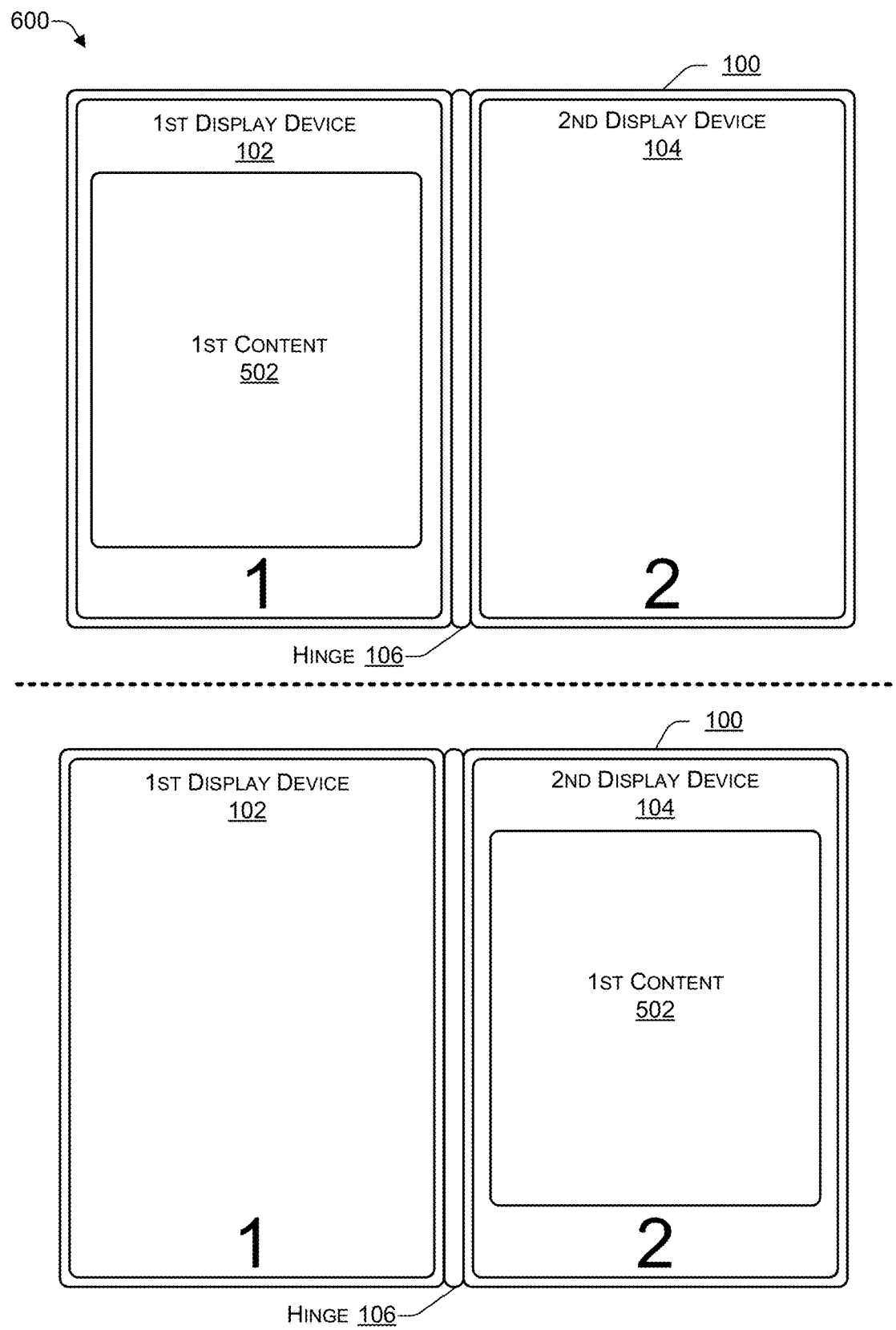
FIG. 6 is a block diagram illustrating a dual-display device in which the operating system is in a single display mode according to some embodiments.

FIG. 6 is a block diagram 600 illustrating a dual-display device in which the operating system is in a single display mode according to some embodiments. When an operating system of the computing device 102 of FIG. 1 is in the single display mode, the first content 502 may be displayed on either (but not both) of the first display device 102 or the second display device 104. For example, the first content 502 may be displayed on the first display device 102 and the second display device 104 may not display any content (e.g., the second display device 104 may be blank or off), as illustrated in the top of FIG. 6. As another example, the first content 502 may be displayed on the second display device 104 and the first display device 102 may not display any content (e.g., the first display device 102 may be blank or off), as illustrated in the bottom of FIG. 6.

Figure 7:
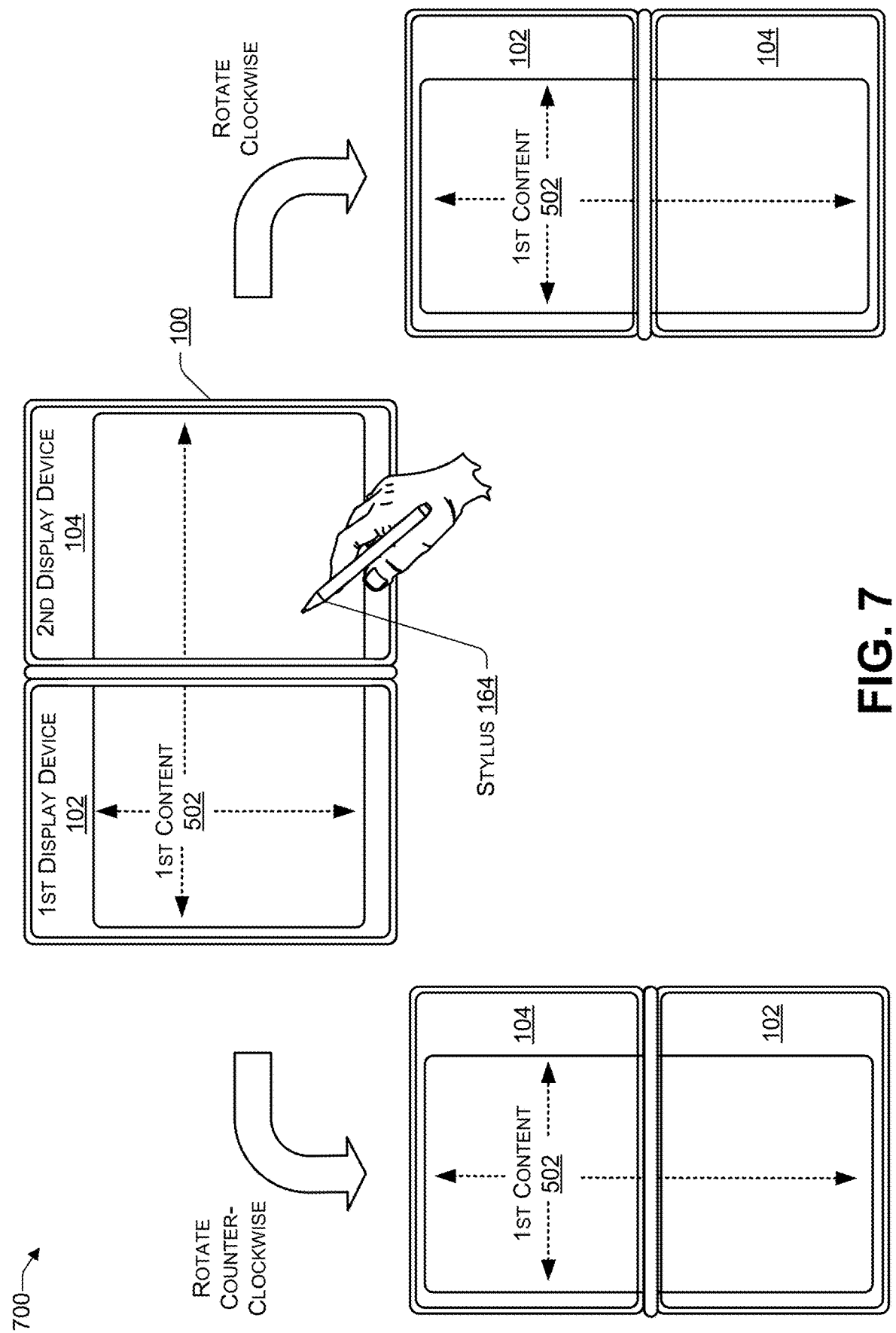
FIG. 7 is a block diagram illustrating a dual-display device in which the operating system is in an extended display mode displaying content that spans both display devices according to some embodiments.

FIG. 7 is a block diagram 700 illustrating a dual-display device in which the operating system is in an extended display mode with content spanning both display devices according to some embodiments. When the operating system of the computing device 102 of FIG. 1 is in the extended display mode, some content, such as the first content 502, may be displayed to span both the first display device 102 and the second display device 104. In some cases, additional content may be displayed on either or both of the first display device 102 or the second display device 104. The user's position relative to the computing device 100 may be determined based on a location of touch-input provided by a user's finger (or other appendage) or a touch-input device, such as the stylus 164.

The dual-display computing device 100 may be placed on a surface that is approximately parallel to the earth's surface. When the user rotates the computing device 100 counterclockwise, the computing device 100 may automatically re-position the first content 502, as illustrated in FIG. 7, by rotating the content 502 clockwise 90 degrees. When the user rotates the computing device 100 clockwise, the computing device 100 may automatically re-position the first content 502, as illustrated in FIG. 7, by rotating the content 502 clockwise 270 degrees. In this way, when the user re-positions (e.g., re-orients) the computing device 100, the content 502 may be rotated to display the first content 502 in a correct orientation relative to the user. In contrast, when a conventional computing device is placed on a surface, such as a table, and rotated 90 degrees or 270 degrees, the computing device may not re-position the content 502. Instead, with a conventional computing device, the user may be forced to pick up and hold the conventional computing device in such a way that the content 502 is repositioned in the manner the user desires, and then place the conventional computing device back down on the surface.

Figure 8:
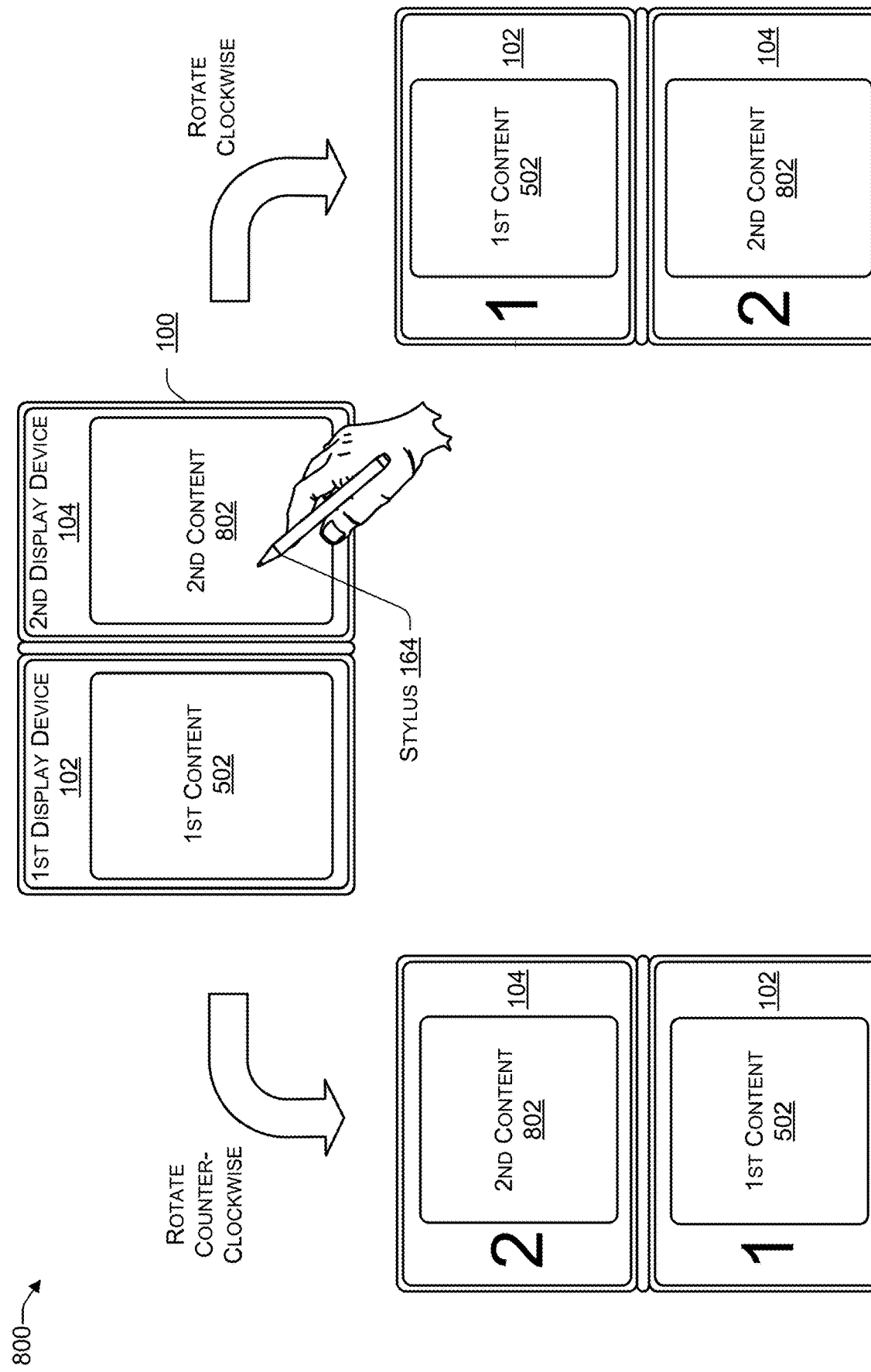
FIG. 8 is a block diagram illustrating a dual-display device in which the operating system is in an extended display mode displaying first content and second content according to some embodiments.

FIG. 8 is a block diagram 800 illustrating a dual-display device in which the operating system is in an extended display mode with first content and second content according to some embodiments. When the operating system of the computing device 102 of FIG. 1 is in the extended display mode, the first content 502 may be displayed on the first display device 102 and second content 802 may displayed on the second display device 104. In some cases, additional content may be displayed on either or both of the first display device 102 or the second display device 104. The user's position relative to the computing device 100 may be determined based on a location of touch-input provided by a user's finger (or other appendage) or a touch-input device, such as the stylus 164.

The dual-display computing device 100 may be placed on a surface that is approximately parallel to the earth's surface. When the user rotates the computing device 100 counterclockwise, the computing device 100 may automatically re-position the first content 502 and second content 802, as illustrated in FIG. 8, by rotating each of the content 502, 802 clockwise 90 degrees. When the user rotates the computing device 100 clockwise, the computing device 100 may automatically re-position the content 502, 802, as illustrated in FIG. 8, by rotating the content 502, 802 clockwise 270 degrees. In this way, when the user re-positions (e.g., re-orients) the computing device 100, the content 502, 802 may be rotated to a correct (e.g., viewable) orientation relative to the user. In contrast, when a conventional computing device is placed on a surface, such as a table, and rotated clockwise 90 degrees or counterclockwise 90 degrees, the computing device may not re-position the content 502, 802. Instead, with a conventional computing device, the user may be forced to (1) pick up and hold the conventional computing device in such a way that the content 502, 802 is repositioned in the manner the user desires, and then (2) place the conventional computing device back down on the surface.

Figure 9:
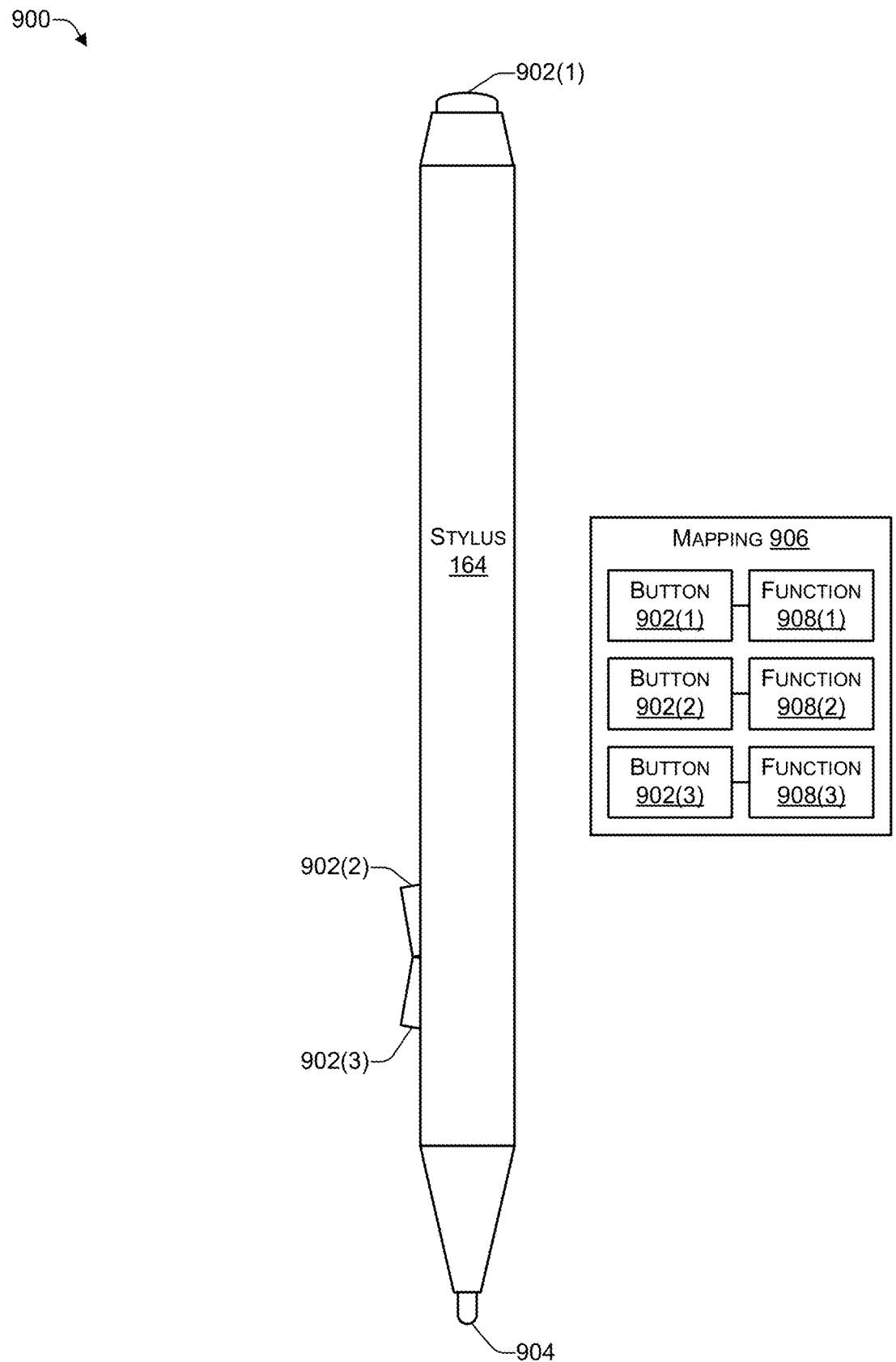
FIG. 9 is a block diagram of an architecture of a stylus according to some embodiments.

FIG. 9 is a block diagram of an architecture 900 of a stylus according to some embodiments. The stylus 164 may be approximately cylindrical in shape and include one or more buttons, with each button mapped to perform a particular function. In some cases, a single button-press of a particular button may be mapped to perform a first function, a double button-press of the particular button may be mapped to perform a second function, and so on. A double button-press may be an operation where a user presses and releases the particular button within a predetermined (e.g., relatively short) time period, such as between 100 to 900 milliseconds. A default value of the double button-press time interval may be 500 milliseconds. The function that each button press performs may include one or more commands or operations, including, for example, executing a macro or a script that includes multiple commands or operations. A manufacturer of the computing device 100 may provide pre-defined functions associated with button-presses. In addition, the user may be provided with the ability to create user-defined functions and to associate each user-defined function with a particular button. A user may use a stylus configuration control panel of an operating system of the computing device 100 to define the various mappings and functions of the buttons of the stylus 164.

As illustrated in FIG. 9, the stylus 164 may include buttons 902(1), 902(2), 902(3), and 902(4). Of course, the stylus 164 is shown as having four buttons purely for illustration purposes. Depending on the implementation, the stylus 164 may include more than four buttons or less than four buttons.

Button 902(1) may be located at one end of the stylus 164 (e.g., where an eraser of a pencil or a mechanism to retract/extend a tip of a retractable pen is typically located). The button 902(1) may be used to turn on the stylus 164 (e.g., the stylus 164 may automatically turn off after a predetermined time interval has elapsed during which no movement of the stylus and no button presses were detected), initiate the stylus 164 pairing (e.g., Bluetooth® or other wireless near field communication) with a nearby computing device, perform an "erase" function (similar to an eraser on a pencil), another function, or any combination thereof.

Buttons 902(2) and 902(3) may be located on a barrel of the stylus 164 and may each be configured to perform various functions. In a default configuration, the button 902(2) may correspond to a right click of a two-button mouse and the button 902(3) may correspond to a left click of the two-button mouse. Alternately, the button 902(2) may correspond to the left click and the button 902(3) may correspond to the right click of a two-button mouse.

Tip 904 may be located at an opposite end of the stylus 164 (e.g., where a nib or a pen or a point of a pencil is typically located) from the button 902(1). The tip 904 may be used to perform a "write" function (similar to a tip of a pencil or pen) by tracking a location of the tip 904 on the display devices 102, 104 of the computing device 100 of FIG. 1. Handwriting recognition software, optical character recognition (OCR) software or another type of software on the computing device 100 may be used to convert the input provided by movement of the tip 904 into characters, letters, numbers, words, and the like.

The stylus 164 (or the computing device 100) may store a mapping 906 that maps each of the buttons 902 to a particular function. For example, the button 902(1) may be mapped to a function 908(1) (e.g., power on the stylus 164, initiate pairing the stylus 164 to a nearby computing device, such as the computing device 100, and the like), the button 902(2) may be mapped to a function 908(2) (e.g., right-click or left click of a mouse), and the button 902(3) may be mapped to a function 908(3) (e.g., left-click or right click of a mouse).

Figure 10:
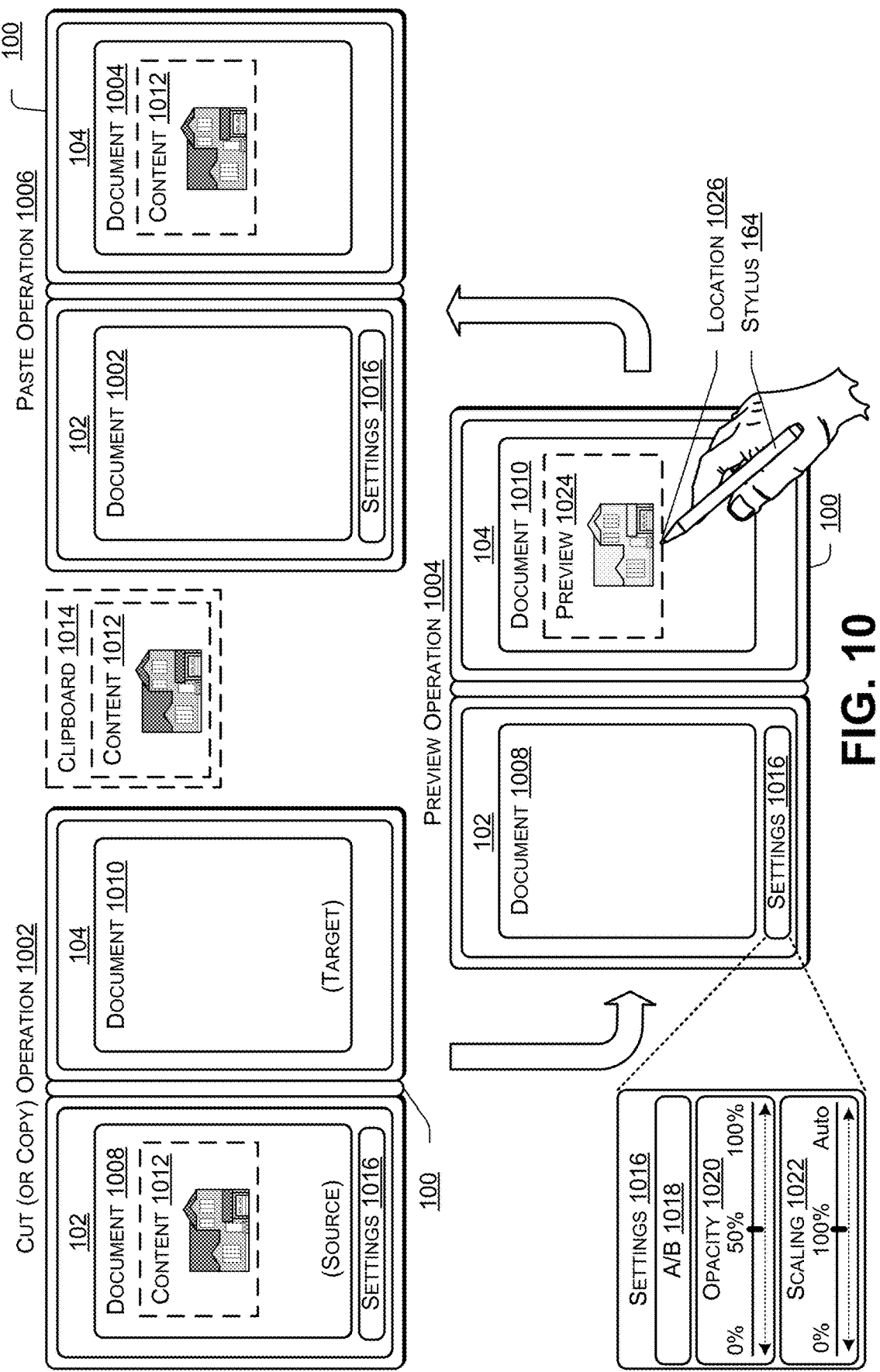
FIG. 10 is a block diagram illustrating previewing a paste operation according to some embodiments.

FIG. 10 is a block diagram illustrating previewing a paste operation according to some embodiments. In FIG. 10, a user may perform a cut (or copy) operation 1002, perform a preview operation 1004, and perform a paste operation 1006.

The computing device 100 may display a document 1008 and a document 1010. The documents 1008, 1010 may be any type of application window capable of storing content, such as a word processor, a web page, a presentation, or another type of application window. In some cases, the document 1010 may be a different document than the document 1008. In other cases, the document 1008 may be a first portion of a document and the document 1010 may be a second portion of the same document. The document 1008 may include, for example, text, a digital image (e.g., photo), a graphical image (e.g., illustration, icon, or the like), a spreadsheet, another type of content, or any combination thereof. The user may select content 1012 (e.g., the content 1012 may be a portion of the content in the document 1008) and perform the cut (or copy) operation 1002, causing the content 1012 to be added to (e.g., stored in) a clipboard application 1014. For example, the clipboard 1014 may be provided by an operating system or an application being executed by the computing device 100. For a cut operation, after the content 1012 is added to the clipboard 1014, the content 1012 may be deleted from the document 1008. For a copy operation, the content 1012 may be added to the clipboard 1014, and the content 1012 may remain in the document 1008. The user may select the content 1012 and perform the cut (or copy) operation 1002 using the stylus 164. For example, the user may select the content 1012 by dragging the tip 904 of the stylus 164 on the display device 102 to create a shape (e.g., as illustrated by the dashed lines) that approximately surrounds the content 1012. The user may cut (or copy) the selected content 1012 by selecting one of the buttons 902 that is mapped to a cut (or copy) function.

The user may instruct the computing device 100 to perform the preview operation 1004 by selecting (e.g., pressing) a sequence of one or more of the buttons 902 that is mapped to a preview function. Selecting the sequence of buttons 902 may cause the stylus 164 to wirelessly transmit a preview command to the computing device 100. The preview operation 1004 may cause the computing device 100 to display a preview pane 1024 of the content 1012 that was most recently added to the clipboard. The computing device 100 may display the preview 10124 based on settings 1016. For example, the settings 1016 may include an above/below (A/B) setting 1018, an opacity setting, and a scaling setting 1022. The A/B setting 1018 may specify whether the preview pane 1024 is displayed above or below the location 1026 (e.g., of the tip 904 of the stylus 164). The touch sensors 162 associated with the display devices 102, 104 may provide data associated with a location of the tip 904 relative to the display devices 102, 104. In FIG. 10, the preview pane 1024 is displayed above the location 1026. The opacity setting 1020 may specify an opacity of the content 1012 when the content 1012 is being displayed in the preview pane 1024. For example, the opacity setting 1020 may be set to between 0% and 100%. The scaling setting 1022 may specify a size of the content 1012 when the content 1012 is being displayed in the preview pane 1024. For example, the scaling setting 1022 may be set to between 0% and 200% (or greater than 200%). The scaling setting 1022 may include an "automatic sizing" setting in which the computing device 100 automatically (e.g., without human interaction) scales the content 1012 to fit an available space of the document 1010 when displaying the preview 1024. For example, the computing device 100 may determine a content length and a content width of the content 1012, an available length and an available width of the document 1010 at the location 1026, compare the content length to the available length, compare the content width to the available width, and then automatically scale the content 1012 accordingly to fit into the available length and available width. The computing device 100 may provide defaults for the settings 1016, such as, for example, above for the A/B setting 1018, 50% for the opacity setting, and 100% for the scaling setting 1022. Of course, the user may override the default values for the settings 1016 by providing user-specified values for the settings 1016 using a user interface (UI) of the settings 1016. For example, as illustrated in FIG. 10, the UI may include a slider that the user can move to select a particular value for each of the settings 1016, such as the settings 1020, 1022.

The preview pane 1024 may be displayed at a location 1026 that is near the tip 904 of the stylus 164 and with the opacity 1020 and the scaling 1022. The preview pane 1024 may track the movements of the tip 904 while the button 902 (that is mapped to the preview function) is selected (e.g., pressed). The user may reposition (e.g., relocate) the tip 904 of the stylus 164 while viewing the preview pane 1024 until the user is satisfied with the positioning of the preview pane 1024. As the user moves the tip 904 of the stylus 164, up, down, left, right, or any combination thereof, the preview pane 1024 may move in a similar manner as the location of the preview pane 1024 tracks the location 1026 of the tip 904. The preview pane 1024 may appear to be temporarily "stuck" to the tip 902 of the stylus 164, causing the location of the preview pane 1024 to track the location 1026 of the top 902 of the stylus 164.

In some cases, the user may manually resize the preview 1024 using the stylus 164. For example, the user may temporarily "freeze" the location of the preview 1024 by selecting one of the buttons 902 or by tapping the tip 904 one of the display devices 102, 104. While the location of the preview 1024 is temporarily fixed, the user may manually resize the preview 1024 by using the stylus 164 to select and drag (e.g., move) a corner of the preview pane 1024. If the preview pane 1024 is displayed with resizing "handles", the user may manually resize the preview 1024 by using the stylus 164 to select and drag (e.g., move) one of the resizing "handles" of the preview pane 1024. For example, dragging a corner or a handle towards a center of the preview pane 1024 may decrease a size of the preview 1024 while dragging a corner or a handle away from the center of the preview pane 1024 may increase a size of the preview pane 1024. The computing device 100 may keep track of the resizing and store the information as scaling 1022. While the preview 1024 is frozen, the user may reposition the preview 1024 by moving the preview 1024 from a first location to a second location. For example, the user may move the preview 1024 using the stylus 164, the user's appendage (e.g., finger), cursor keys, or the like.

After the user is satisfied with the position and the size of the preview pane 1024, the user may perform the paste operation 1006, causing the content 1014 to be pasted into the document 1004. If the user manually resized the preview pane 1024, then the size of the content 1014 may be approximately the same size as that of the content in the resized preview pane 1024. For example, while the preview 1024 is being displayed (e.g., and the button 902 that is mapped to the preview operation is selected), the user may perform a double tap (e.g., two taps within a predetermined time interval, such as 500 milliseconds) of the tip 904 of the stylus 164 at the location 1026 on the display device 104, causing the content 1012 to be pasted into the document 1004 at the location 1026. Of course, the user may perform another action to perform the paste operation 1006. For example, the user may release the button 902 that is mapped to the preview operation, causing the paste operation to be performed. As another example, the user may perform the paste operation 1006 by selecting one (or more) of the buttons 902 or by performing a double click of one of the buttons 902. After performing the paste operation 1006, the computing device 100 may stop displaying the preview pane 1024.

In some cases, the settings 1016 may enable the user to specify how the content 1012 is scaled during the paste operation 1006. For example, the user may specify that the content 1012 be pasted into the document 1010 (1) using the scaling 1022, (2) at 100% scaling (e.g., 100% of the original size), or (3) using auto-scaling (e.g., auto-sizing) as determined by the computing device 100 (e.g., based on scaling the content length and the content width of the content 1012 to fit a document length and a document width of the document 1010). If the user manually adjusts the size of the preview pane 1024 during the preview operation 1004 (e.g., prior to the paste operation 1006), then the scaling 1022 may automatically be set to the scaling used to achieve the manually adjusted size. For example, if the user manually adjusts the size of the preview pane 1024 by doubling the size, then the scaling 1022 may indicate 200%.

Thus, a user may cut (or copy) content from a source document into a clipboard application of a computing device. The user may select a stylus function to provide a preview of a paste operation in a target document. The source document and the target document may be the same document or may be different documents. The preview of the content may display the most recently added content in the clipboard at a particular location in the target document, with a particular size, and a particular opacity. The particular location where the preview of the content is displayed may be determined based on a current location of a tip of a stylus. The location where the preview is displayed may track the movement of the tip of the stylus prior to the user performing (e.g., confirming) a paste operation. The opacity and the size of the content in the preview may be determined based on preview settings. The computing device may provide default preview settings, such as 50% opacity and auto-sizing the content to the target location, which the user may override by providing user-provided preview settings. After the user is satisfied with the location of the content, based on viewing the preview, the user may select a stylus function to perform (e.g., confirm) the paste of the content at the location of the tip of the stylus. The content may be pasted into the target document at a location specified by the user. The user may specify the location of the paste by moving the tip of the stylus, while the preview pane tracks the location of the tip. After the paste operation has been performed and the content has been pasted into the target document, the preview may no longer be displayed. In this way, a user can visually see how content will appear in the target document and position the content as the user desire before the content is pasted into the target document.

Figure 11:
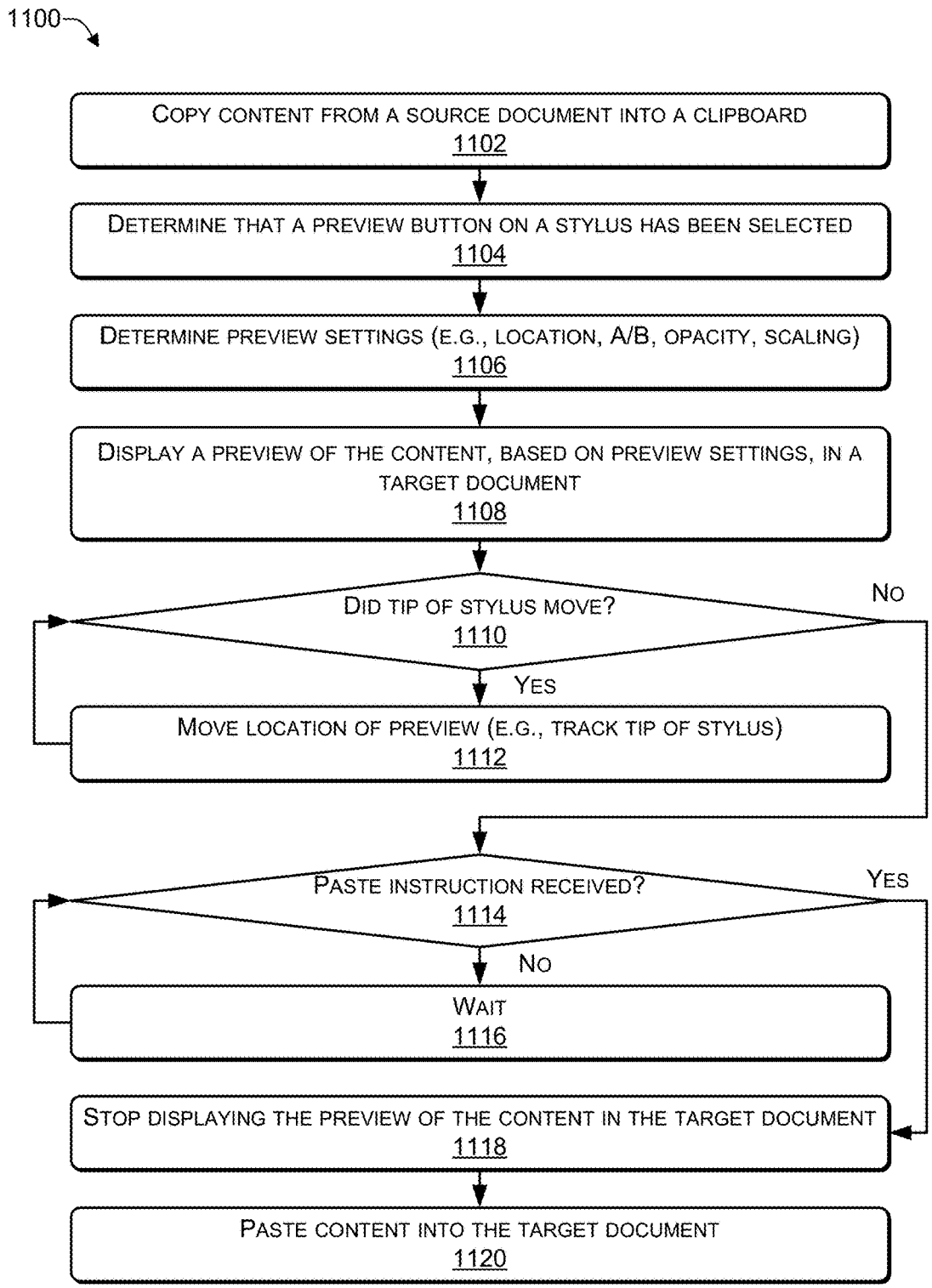
FIG. 11 is a flowchart of a process that includes displaying a preview of content according to some embodiments.

In the flow diagram of FIG. 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 1100 is described with reference to FIGS. 1, 2, 3, 4, 5, 6, 7, 8, 9, and 10 as described above, although other models, frameworks, systems and environments may be used to implement this process.

FIG. 11 is a flowchart of a process 1100 that includes displaying a preview of content (e.g., prior to a paste operation) according to some embodiments. The process 1100 may be performed by one or more components of the computing device 100 of FIGS. 1, 2, 3, 4, 5, 6, 7, 8, 9, 10, and 12. For example, the CPU 112 may execute software instructions stored in the memory 116 to perform the process 1100.

At 1102, content from a source document may be copied from a source document to a clipboard application (e.g., a storage buffer). For example, in FIG. 10, the content 1012 from the source document 1008 may be placed in the clipboard 1014.

At 1104, a determination may be made that a preview button on a stylus has been selected. At 1106, preview settings (e.g., location of preview, whether to preview above or below location of tip, opacity, scaling, and the like) may be determined. At 1108, a preview of the content may be displayed, based on the preview settings, in a target document. For example, in FIGS. 9 and 10, the user may press one of the buttons 902 that is mapped to a corresponding one of the functions 908 to provide a preview function (e.g., to perform the preview operation 1004). The computing device 100 may determine a location of the tip 904 of the stylus 164 (e.g., based on pressure applied by the tip 904 to the touch sensitive display devices 102, 104), and, based on the settings 1016, determine whether the preview pane 1024 is to be displayed above or below the tip 904, determine the opacity 1020 with which to display the content 1012, and determine the scaling 1022 with which to display the content 1022. The computing device 100 may display the preview pane 1024 in the target document 1010 based on (1) the location 1026 of the tip 904 of the stylus 164 and (2) the settings 1016.

At 1110, a determination may be made whether a tip of the stylus has moved. In response to determining, at 1110, that "yes" the tip of the stylus has moved, the process may proceed to 1112, where a location of the preview may be moved (based on a current location of the tip of the stylus), and the process may proceed to 1110. For example, in FIG. 10, if the user moves the tip of the stylus 164 to a different location (e.g., from the location 1026), then the computing device may move the preview pane 1024 accordingly. In this way, the preview pane 1024 may appear "stuck to the tip of the stylus 164 by tracking the movements of the tip of the stylus 164.

In response to determining, at 1110, that "no" the tip of the stylus has not been moved (e.g., for more than a predetermined amount of time), the process may proceed to 1114, where a determination may be made whether a past command has been received. After the computing device 100 determines that the user is no longer moving the tip of the stylus 164 to reposition the preview pane 164, e.g., because the user is satisfied with where the preview pane 1024 is being displayed in the target document 1010, the computing device 100 may wait to receive a paste instruction. For example, in FIGS. 9 and 10, the user may send the paste instruction by selecting one of the buttons 902 of the stylus 164 that is mapped to the paste operation 1006.

In response to determining, at 1114, that "no" a paste instruction has not been received, the process may proceed to 1114. The process may repeat 1114 and 1116 until the process determines that a paste instruction has been received. For example, in FIG. 10, after displaying the preview pane 1024, the computing device 100 may wait to receive a paste instruction from the stylus 164. In some cases, the user may tap the tip 904 once (or twice within a predetermined time interval) on the location 1026 to instruct the computing device 100 to perform the paste operation 1006. In other cases, the user may select one of the buttons 902 of the stylus 164, thereby causing the stylus 164 to wirelessly transmit (e.g., using an NFC technology, such as Bluetooth®) the paste instruction to the computing device 100.

In response to determining, at 1114, that "yes" a paste instruction has been received, the process may proceed to 1118, where, the preview of the content may no longer be displayed in the target document. At 1120, the content (e.g., that was being displayed in the preview) may be pasted into the target document. After the computing device 100 receives an instruction from the user to perform the paste operation 1006, the computing device 100 may no longer display the preview 1024 in the target document 1010 and may execute the paste operation 1006 by pasting the content 1012 into the document 1004 at the location 1026.

Thus, a user may place content from a source document into a clipboard application of a computing device. The user may send a command, using a stylus, instructing the computing device to provide a visual preview of pasting the content into a target document. The source document and the target document may be different portions of the same document or may be different documents. The preview of the content may display the most recently added content in the clipboard at a particular location in the target document, with a particular size, and a particular opacity. The particular location where the preview of the content is displayed may be determined based on a current location of a tip of a stylus. The location where the preview is displayed may track the movement of the tip of the stylus prior to the user instructing the computing device to perform a paste operation. The opacity and the size of the content in the preview may be determined based on preview settings. The computing device may provide default preview settings, such as 50% opacity and auto-sizing the content to the target location. The user may be provided with the ability to modify the default preview settings. While viewing the preview, the user may position the content where the user desires before instructing (e.g., using the stylus) the computing device to paste the content at the location of the tip of the stylus. The content may be pasted into the target document at the location specified by the user using the stylus. The user may adjust the location of the content by moving the tip of the stylus, while the preview pane tracks the location of the tip during the preview. After the paste operation has been performed and the content has been pasted into the target document, the preview may no longer be displayed. In this way, the user may visually position the content as desired using the preview before pasting the content into the target document.

Figure 12:
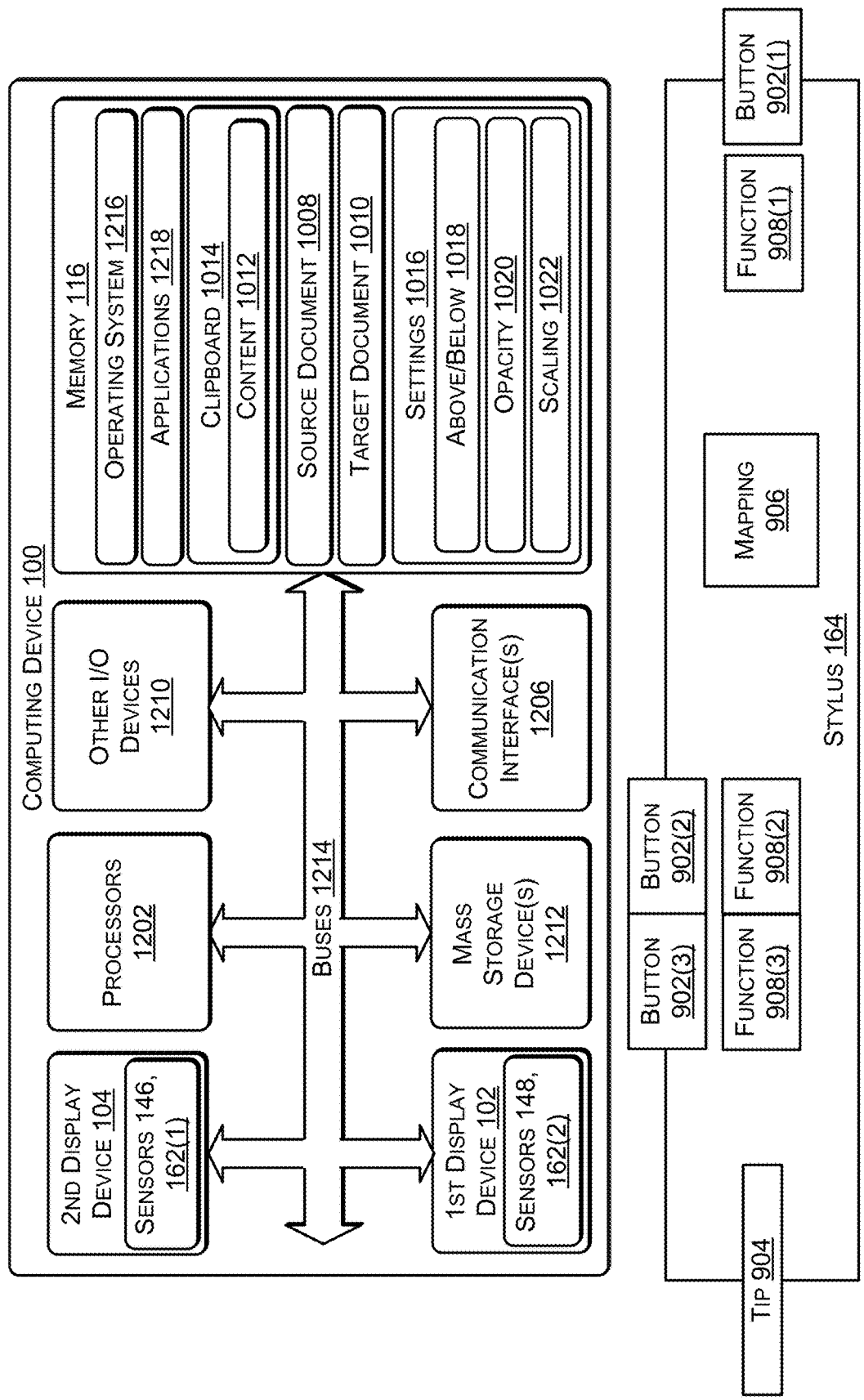
FIG. 12 illustrates an example configuration of a computing device and a stylus that can be used to implement the systems and techniques described herein.

FIG. 12 illustrates an example configuration of the computing device 100 of FIG. 1 that can be used to implement the systems and techniques described herein. The computing device 100 may include one or more processors 1202 (e.g., the CPU 112 and the GPU 114 of FIG. 1), the memory 116, communication interfaces 1206 (e.g., including the I/O ports 120), the display devices 108, 110, other input/output (I/O) devices 1210 (e.g., keyboard, trackball, and the like, such as the additional components 144), and one or more mass storage devices 1212 (e.g., including the memory 116), configured to communicate with each other, such as via one or more system buses 1214 (e.g., including the data bus 128, 130) or other suitable connections. While a single system bus is illustrated for ease of understanding, it should be understood that the system buses 1214 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1202 are one or more hardware devices that may include a single processing unit or a number of processing units, all of which may include single or multiple computing units or multiple cores. The processors 1202 may include the GPU 114 integrated into the CPU 112 or the GPU 114 may be a separate processor device from the CPU 112. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 116, mass storage devices 1212, or other computer-readable media.

Memory 116 and mass storage devices 1212 are examples of computer storage media (e.g., memory storage devices) for storing instructions that can be executed by the processors 1202 to perform the various functions described herein. For example, memory 116 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1212 may be collectively referred to as memory or computer storage media herein, and may be any type of non-transitory media capable of storing computer-readable, processor-executable program instructions as computer program code that can be executed by the processors 1202 as a particular machine configured for carrying out the operations and functions described in the implementations herein.

The computing device 100 may also include one or more communication interfaces 1206 for exchanging data via a network. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1206 can also provide communication with external storage, such as a storage array, network attached storage, storage area network, the cloud storage 232, or the like. The communication interfaces 1206 may enable the computing device 100 to communicate (e.g., transmit information to and receive information from), using a near field communication technology, such as Bluetooth®, with the stylus 164. For example, the touch sensors 162(1), 162(2) may be capable of determining a location and an amount of pressure (e.g., at a level between 0 and 255) that the tip 904 of the stylus 164 is exerting on the display devices 102, 104. The computing device 100 may receive information from the stylus 164 regarding which of the buttons 902 the user selected, which of the functions 908 the user selected using the buttons 902, and the like.

The display devices 102, 104 may be located in the housings 108, 110, respectively, and may be connected using one or more hinges (e.g., the hinges 106 of FIG. 1). The hinges may enable each display device to be placed at an angle between about 0 and about 360 relative to the other display device. For example, the display devices 102, 104 may be used for displaying information and images to users. Other I/O devices 1210 may be devices that receive various inputs from a user and provide various outputs to the user, and may include a keyboard, a touchpad, a mouse, a printer, audio input/output devices, and so forth.

The computer storage media, such as memory 116 and mass storage devices 1212, may be used to store software and data. For example, the computer storage media may be used to store an operating system 1216, one or more applications 1218, the clipboard 1014, the documents 1008, 1010, and the settings 1016.

A user may instruct the computing device 100 to cut or copy the content 1012 from the source document 1008 and place the content 1012 into the clipboard application 1014. The user may send a command, using the stylus 164, instructing the computing device 100 to provide a preview associated with pasting the content 1012 into the target document 1010, e.g., how the content 1012 would appear if pasted into the target document 1010. The source document 1008 and the target document 1010 may be different portions of the same document or may be different documents. The preview may display the most recently added content 1012 in the clipboard 1014 at a particular location in the target document 1010, with a particular size, and a particular opacity. The particular location where the preview of the content is displayed may be determined based on a current location of the tip 904 of the stylus 164. The location where the preview is displayed may track the movement of the tip 904 of the stylus 164 during the preview and prior to the paste. The opacity and the size of the content 1012 in the preview may be determined based on the preview settings 1016. The computing device may provide default preview settings 1016, such as 50% opacity and auto-sizing the content to the target location, which the user may modify. While viewing the preview, the user may position the content 1012 where the user desires and instruct (e.g., using the stylus 164) the computing device 100 to paste the content 1012 at the location of the tip 904 of the stylus 164. The content 1012 may be pasted into the target document 1010 at a location specified by the user using the stylus 164. The user may adjust the location of the content by moving the tip 904 of the stylus 164, while the preview tracks the location of the tip 904. After the paste operation has been performed and the content 1012 has been pasted into the target document 1010, the preview may no longer be displayed. In this way, the user may visually position the content 1012 as desired using the preview prior to pasting the content 1012 into the target document 1010.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, via a communication link established between a computing device and a stylus, at the computing device comprising a first touch-sensitive display device and a second touch-sensitive display device, a preview command from the stylus;
determining, by the computing device, a first location of a tip of the stylus on one of the first touch-sensitive display device or the second touch-sensitive display device;
retrieving stored content from a clipboard application;
displaying a user interface of a preview setting comprising an opacity setting and a scaling setting associated with a preview of the stored content;
determining an opacity specified by the opacity setting and a scaling specified by the scaling setting based on the preview command;

displaying, by the computing device, the preview of the stored content, the preview having the opacity specified by the opacity setting and a size based on the scaling specified by the scaling setting, wherein the preview is displayed near the first location of the tip of the stylus during a time interval between when a button on the stylus is selected and when the button is de-selected;

determining, by the computing device, that the tip of the stylus has moved from the first location to a second location on one of the first touch-sensitive display device or the second touch-sensitive display device;

moving, by the computing device, the preview of the stored content to near the second location;

receiving, via the communication link, by the computing device, a paste instruction from the stylus; and pasting, by the computing device, the stored content into a target document, according to the paste instruction.

2. The method of claim 1, further comprising:
copying content from a source document to a clipboard application.

3. The method of claim 1, wherein the paste instruction received from the stylus includes an instruction to modify the size of the stored content upon pasting.

4. The method of claim 1, wherein displaying the preview of the stored content comprises:
determining an above/below setting associated with the preview; and
displaying the preview of the stored content either above the tip of the stylus or below the tip of the stylus based on the above/below setting.

5. A computing device comprising:
a first touchscreen display;
a second touchscreen display;
one or more hinges coupling the first touchscreen display to the second touchscreen display, wherein the one or more hinges enable the first touchscreen display to be placed at an angle between 0 degrees and 360 degrees relative to the second touchscreen display;
a communication interface communicatively linked to a stylus;
one or more processors; and
one or more non-transitory computer readable media storing instructions executable by the one or more processors to perform operations comprising:
displaying a second document on the second touchscreen display;
receiving a preview command from the stylus;
determining a first location of a tip of the stylus on the second touchscreen display;
retrieving stored content from a clipboard application;
displaying a user interface of a preview setting comprising an opacity setting and a scaling setting associated with a preview of the stored content;
determining an opacity specified by the opacity setting and a scaling specified by the scaling setting based on the preview command;
displaying a preview of the stored content, the preview having the opacity specified by the opacity setting and a size based on the scaling specified by the scaling setting, wherein the preview is displayed near the first location of the tip of the stylus on the second touchscreen display during a time interval between when a button on the stylus is selected and when the button is de-selected;
determining that the tip of the stylus has moved from the first location to a second location on the second touch-sensitive display device;
moving the preview of the stored content from near the first location to near the second location;
receiving, from the stylus, a paste instruction from the stylus; and
pasting the stored content into the second document, according to the paste instruction.

6. The computing device of claim 5, the operations further comprising:
displaying a first document on the first touchscreen display;
receiving, from the stylus, a selection command selecting content in a portion of the first document;
receiving, from the stylus, a copy command;
copying the content from the first document; and
storing the content in a clipboard application to create the stored content.

7. The computing device of claim 5, wherein:
the user interface enables a default value of the opacity setting to be modified.

8. The computing device of claim 5, wherein pasting the stored content into the second document comprises:
automatically modifying a size of the stored content based on one or more margins associated with the second document to create modified content; and
pasting the modified content into the second document.

9. One or more non-transitory computer-readable media storing instructions that are executable by one or more processors to perform operations comprising:
receiving a preview command from a stylus that is communicatively linked to a computing device, the computing device comprising a first touch-sensitive display device coupled by one or more hinges to a second touch-sensitive display device;
determining a first location of a tip of the stylus on the second touch-sensitive display device;
retrieving stored content from a clipboard application;
displaying a user interface of a preview setting comprising an opacity setting and a scaling setting associated with a preview of the stored content;
determining an opacity specified by the opacity setting and a scaling specified by the scaling setting based on the preview command;
displaying the preview of the stored content near the first location, the preview having the opacity specified by the opacity setting and a size based on the scaling specified by the scaling setting, wherein the preview is displayed near the first location of the tip of the stylus during a time interval between when a button on the stylus is selected and when the button is de-selected;
determining that the tip of the stylus has moved from the first location to a second location on the second touch-sensitive display device;
moving the preview of the stored content from near the first location to near the second location;
receiving a paste instruction from the stylus; and
pasting the stored content into a target document that is being displayed on the second touch-sensitive display device, according to the paste instruction received from the stylus.

10. The one or more non-transitory computer-readable media of claim 9, further comprising:
displaying a first document on the first touch-sensitive display device;
receiving, from the stylus, a selection command selecting content in a portion of the first document;
receiving, from the stylus, a copy command;
copying the content from the first document; and storing the content in a clipboard application to create the stored content.

11. The one or more non-transitory computer-readable media of claim 9, wherein the paste instruction received from the stylus includes an instruction to modify the size of the stored content upon pasting.

12. The one or more non-transitory computer-readable media of claim 9, wherein receiving the preview command from the stylus comprises:
   determining that a button on the stylus was selected; and
   determining that the button is mapped to the preview command.

13. The one or more non-transitory computer-readable media of claim 9, wherein pasting the stored content into the target document that is being displayed on the second touch-sensitive display device comprises:
   automatically modifying a size of the stored content based on one or more margins associated with the target document to create modified content; and
   pasting the modified content into the target document.

14. The method of claim 1, wherein the opacity setting comprises user-specified values.

15. The method of claim 1, wherein the user interface further comprises an above/below setting associated with the preview.

16. The method of claim 1, wherein receiving the preview command from the stylus comprises determining that a button on the stylus was selected.

17. The method of claim 16, wherein receiving the paste instruction from the stylus comprises determining that the button on the stylus was released.

* * * * *